United States Patent
Chen et al.

(10) Patent No.: US 8,683,585 B1
(45) Date of Patent: Mar. 25, 2014

(54) USING FILE REPUTATIONS TO IDENTIFY MALICIOUS FILE SOURCES IN REAL TIME

(75) Inventors: Joseph H. Chen, Los Angeles, CA (US); Brendon V. Woirhaye, North Whittier, CA (US)

(73) Assignee: Symantec Corporation, Mountain View, CA (US)

( * ) Notice: Subject to any disclaimer, the term of this patent is extended or adjusted under 35 U.S.C. 154(b) by 265 days.

(21) Appl. No.: 13/025,109

(22) Filed: Feb. 10, 2011

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .......................................................... 726/22

(58) Field of Classification Search
USPC .................................................... 726/22–23
See application file for complete search history.

(56) References Cited

U.S. PATENT DOCUMENTS

| | | | |
|---|---|---|---|
| 7,434,261 B2 * | 10/2008 | Costea et al. | 726/22 |
| 7,849,502 B1 * | 12/2010 | Bloch et al. | 726/11 |
| 8,364,811 B1 * | 1/2013 | Erdmann et al. | 709/224 |
| 8,528,080 B2 * | 9/2013 | McCorkendale et al. | 726/22 |
| 2009/0307320 A1 * | 12/2009 | Golan et al. | 709/206 |
| 2011/0162070 A1 * | 6/2011 | Krasser et al. | 726/23 |

* cited by examiner

*Primary Examiner* — Benjamin R Bruckart
*Assistant Examiner* — Karina J Garcia-Ching
(74) *Attorney, Agent, or Firm* — Brill Law Office; Jeffrey Brill (57) ABSTRACT

File reputations are used to identify malicious file sources. Attempts to access files from external sources are monitored. For each monitored attempt to access a file, a reputation of the specific file is determined. Responsive to a determined reputation of a file meeting a threshold, the file is adjudicated to be malicious. Attempts by sources to distribute malicious files are tracked. Responsive to tracked attempts by sources to distribute malicious files, reputations of file sources are determined. Responsive to a determined reputation of a source meeting a threshold, the source is adjudicated to be malicious, and files the source distributes are analyzed to determine whether they comprise malware. Malicious sources are blocked. Malware and malicious sources are analyzed to identify exploits and distribution patterns.

20 Claims, 4 Drawing Sheets

USING FILE REPUTATIONS TO IDENTIFY MALICIOUS FILE SOURCES IN REAL TIME

TECHNICAL FIELD

This disclosure pertains generally to computer security, and more specifically to using file reputations to identify malicious files sources in real time.

BACKGROUND

Many current malware distribution techniques involve using email, spam, social networking applications, instant messaging, social engineering and other means to lead users to malicious distribution sites. In other words, users are lured to a malicious Uniform Address Locator (URL) or Internet Protocol (IP) address, from which the user is infected with malware. These distribution techniques are being used with high success rates to expose massive numbers of people to malware infection.

To successfully take effective countermeasures against the distribution of malware, it is important for a maker of antimalware systems to capture samples of new malware quickly, as well as to identify the distribution and infection techniques that new malware uses. For example, by capturing a sample of a new malware instantiation, a signature identifying the malware can be created and distributed. An antimalware system can subsequently use this signature to detect the malware on infected computers, and to clean the detected infections. By understanding how the malware is distributed and what techniques it uses to infect user's computers (e.g., drive by, deliberate download, social engineering, etc.), an antimalware system can take more effective countermeasures.

One problem encountered in capturing malware samples and attack vectors quickly is that malicious software distribution sources (e.g., malicious websites, URLs, IP addresses) have a limited life span. Distributors of malware frequently change distribution sites, in order to stay one step ahead of detection. When conventional means are used to collect malware samples, a malicious site may no longer be active by the time it is identified and an attempt is made to capture malware therefrom. This prevents the timely capture and analysis of samples from the site. Additionally, in order to analyze the exploit techniques being used by malware being distributed from a malicious site, it is important that the malicious site be up and running. The delay in identifying a malicious site and capturing and analyzing malware being distributed therefrom using conventional techniques is often longer than the malicious distribution site's life span.

It would be desirable to address these issues.

SUMMARY

A malware source management system uses file reputations to identify malicious files sources in real time. Attempts by a plurality of client computers to access files from external file sources are monitored. This monitoring can comprise receiving indications of attempts by client computers to access files from remote file sources. The monitoring can also comprise monitoring the network traffic of the client computers, and detecting attempts to access files from remote file sources in the monitored network traffic. For each monitored attempt by a client to access a file, a reputation of the specific file that the client is attempting to access is determined. This can take the form of receiving reputation information concerning the specific file from an external reputation determining system, performing a reputation determination analysis of the specific file and/or performing a malware detection analysis of the specific file.

Responsive to a determined reputation of a file meeting a specific threshold, that file is adjudicated to be malicious. Attempts to distribute files adjudicated to be malicious to the clients by file sources are tracked. For example, when such an attempt is detected, an identification of the specific file and the specific file source can be stored, as well as the time of the detected attempt. Responsive to tracked attempts by file sources to distribute files adjudicated to be malicious to clients, reputations of file sources are determined. Responsive to a determined reputation of a file source meeting a specific threshold, the file source is adjudicated to be malicious, and files that the malicious source makes available are analyzed to determine whether they comprise malware.

When it is determined that a file being made available by a source adjudicated to be malicious comprises malware, the malware is analyzed to identify the exploits it uses to infect targets. The distribution of files from malicious file sources is also analyzed for this purpose, and to identify file distribution patterns. Access to file sources adjudicated to be malicious can also be blocked.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
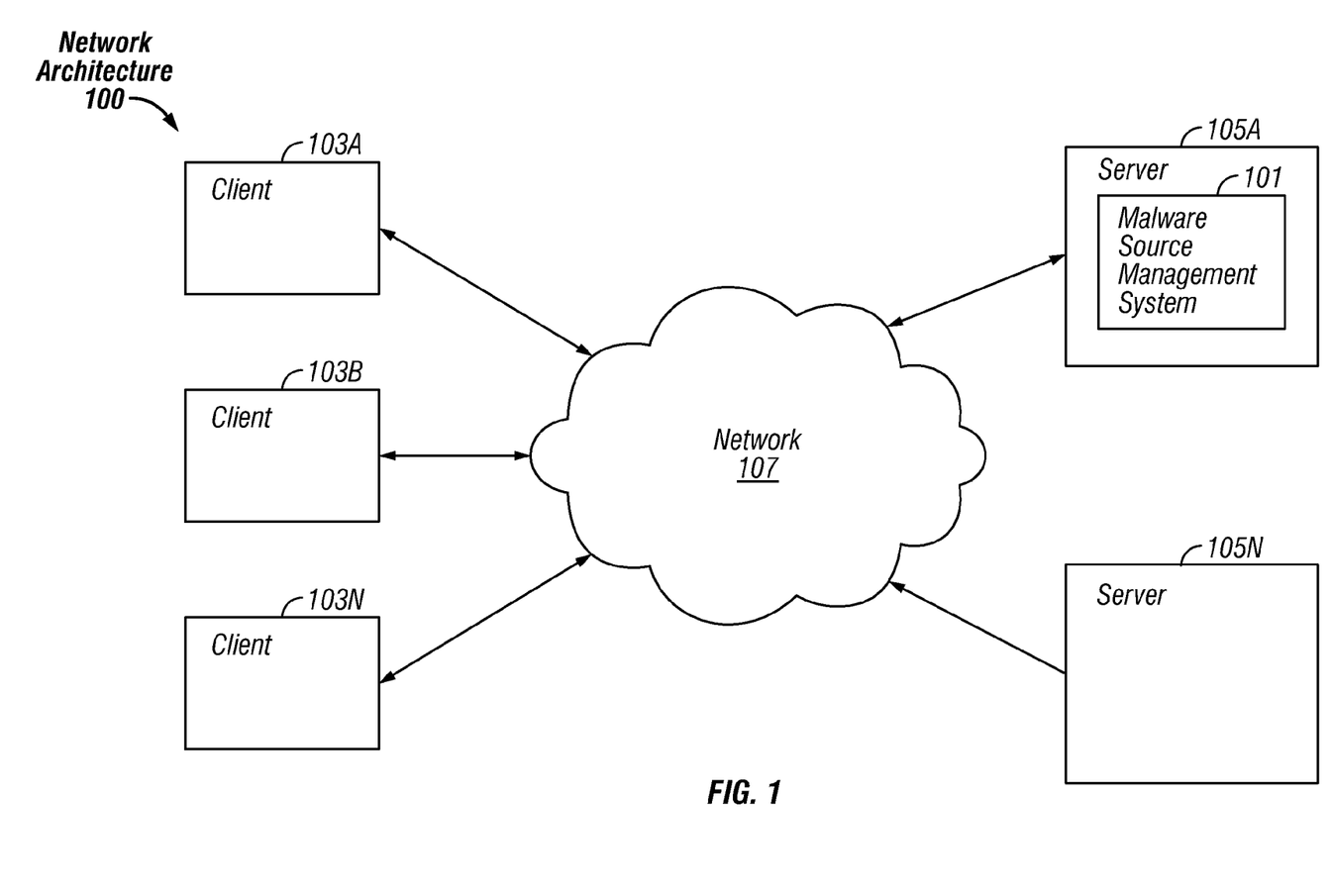
FIG. 1 is a block diagram of an exemplary network architecture in which a malware source management system can be implemented, according to some embodiments.

FIG. 1 is a block diagram illustrating an exemplary network architecture 100 in which a malware source management system 101 can be implemented. The illustrated network architecture 100 comprises multiple clients 103A, 103B and 103N, as well as multiple servers 105A and 105N. In FIG. 1, the malware source management system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
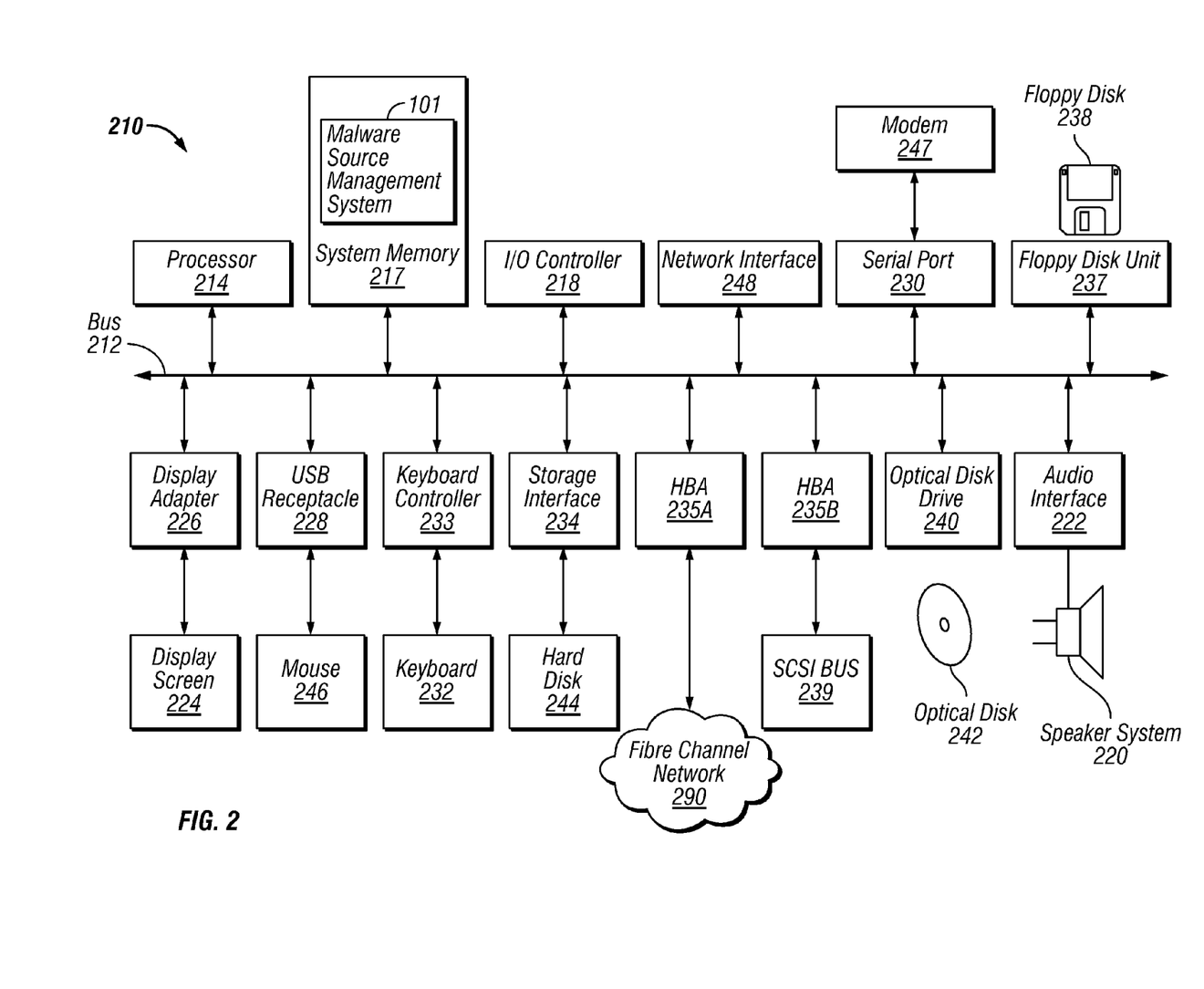
FIG. 2 is a block diagram of a computer system suitable for implementing a malware source management system, according to some embodiments.

FIG. 2 is a block diagram of a computer system 210 suitable for implementing a malware source management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 228, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the malware source management system 101 is illustrated as residing in system memory 217. The workings of the malware source management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
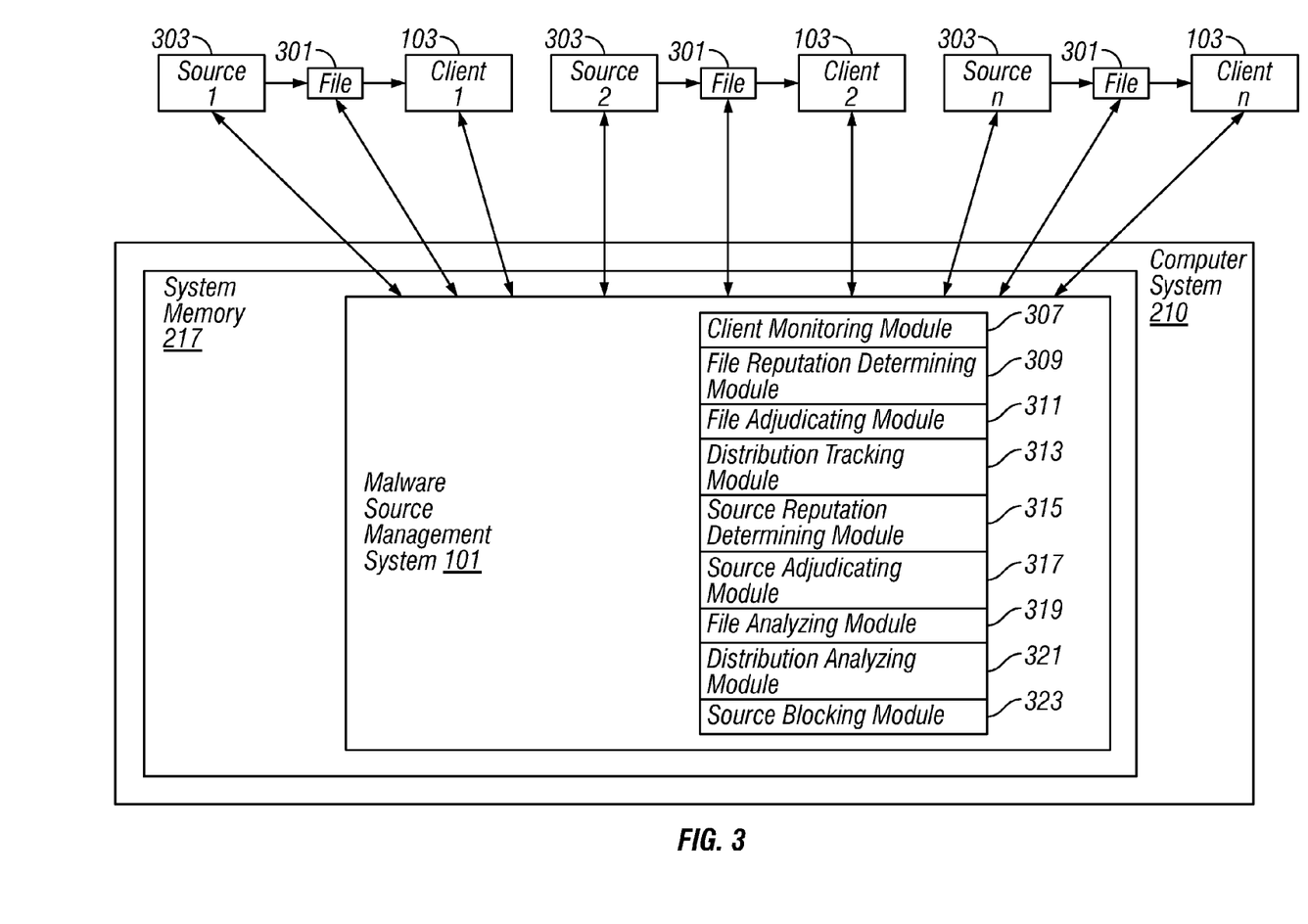
FIG. 3 is a block diagram of the operation of a malware source management system, according to some embodiments.

FIG. 3 illustrates the operation of a malware source management system 101 residing in the system memory 217 of a computer 210, according to some embodiments. As described above, the functionalities of the malware source management system 101 can reside on a client 103, a server 105, or be distributed between multiple computer systems 210, including within a cloud-based computing environment in which the functionality of the malware source management system 101 is provided as a service over a network 107. It is to be understood that although the malware source management system 101 is illustrated in FIG. 3 as a single entity, the illustrated malware source management system 101 represents a collection of functionalities, which can be instantiated as a single or multiple modules as desired (an instantiation of specific, multiple modules of the malware source management system 101 is illustrated in FIG. 3). It is to be understood that the modules of the malware source management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the malware source management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the malware source management system 101 uses reputation information concerning many different files 301 being downloaded by a plurality of clients 103 over time to determine reputations of file sources 303. As the term is used herein, a "file source" 303 can be any external location from which a client 103 obtains files 301 (e.g., a URL, IP address, FTP site, website, etc.). When the reputation of a file source 303 reaches a given threshold, the malware source management system 101 adjudicates the file source 303 as being a source of malware, and various countermeasures are taken as described in detail below.

More specifically, a client monitoring module 307 of the malware source management system 101 monitors clients 103 accessing files 301 from external sources 303 over time. In some embodiments, the clients 103 are in the form of the computers 210 of users of a given antimalware system (not illustrated). In FIG. 3, only three clients are illustrated for visual practicality, but it is to be understood that in practice orders of magnetite more can be deployed. In some embodiments, whenever a client attempts to access or otherwise download a file 301 from an external source 303, a client agent (not illustrated) detects the attempt and transmits a corresponding indication to the client monitoring module 307. In other embodiments, the client monitoring module 307 monitors the network traffic of the clients 103 remotely to detect file 301 access attempts. In any case, client 103 attempts to access files 301 from remote sources 303 are monitored by the client monitoring module 307. In some embodiments, known good files 301 (e.g., files 301 on a whitelist) are exempted from monitoring.

For each monitored attempt by a client 103 to access a file 301, a file reputation determining module 309 of the malware source management system 101 determines the reputation of the specific file 301 that the client 103 is attempting to access. In some embodiments, the file reputation determining module 309 receives this reputation information from a conventional, external reputation determining system (not illustrated). In other embodiments, the file reputation determining module 309 performs a conventional reputation determination analysis itself, looking at factors such as the length of time the file 301 has been known to be circulation, the number of known 301 users of the file 301, specific properties of the structure of the file 301, etc. The reputation of a file 301 is an educated quantification of how likely the file 301 is to comprise malware. In some embodiments, the file reputation determining module 309 uses the file's reputation to set a suspiciousness score for the file 301. The setting of the suspiciousness score of a file 301 can further or instead comprise performing a bona fide malware detection analysis of the file 301. This can be done using any conventional malware detection technique, such as scanning for signatures of known malware, performing heuristic analysis, etc.

In any case, where the reputation and/or suspiciousness score of the file 301 meets a specific threshold, a file adjudicating module 311 of the malware source management system 101 adjudicates the file 301 as being malicious for the purpose of tracking sources 303 distributing malware as described herein. It is to be understood that the specific threshold at which the file adjudicating module 311 adjudicates a file 301 to be malicious is a variable design parameter which can be different between embodiments. Examples of specific thresholds that are used in different embodiments range from known malicious to highly suspect to moderate degrees of suspicion, based on the desired tolerance level for false positives.

A distribution tracking module 313 of the malware source management system 101 tracks the origination of malware from individual file sources 303. More specifically, whenever the file adjudicating module 311 adjudicates a file 301 which a client 103 attempts to access as being malicious, the distribution tracking module 313 notes the corresponding file source 303, and stores an indication of the attempt to distribute the specific malicious file 301 by the given file source 303. This indication can comprise information such as the identification of the file source 303 itself, the identification of the malicious file 301 (e.g., a hash), the time of the attempt, the target of the attempt, etc. The distribution tracking module 313 stores the indications, for example, in a database (not illustrated) or other suitable storage mechanism.

Using the indications, a source reputation determining module 315 of the malware source management system 101 determines reputations of file sources 303. The reputation of a file source 303 is lowered based on factors such as each new piece of malware being distributed by the source 303, each incidence of the source 303 attempting to distribute malware, the frequency with which such attempts are made, etc. The exact factors that the source reputation determining module 315 uses to determine file source 303 reputations, as well as any weighting applied to given factors, are variable design parameters. Where the reputation of a given file source 303 meets a specific threshold, a source adjudicating module 317 of the malware source management system 101 adjudicates the file source 303 as being malicious. As with the reputations of files 301, the specific threshold at which the source adjudicating module 317 adjudicates a file source 303 to be malicious is a variable design parameter which is different in different embodiments. In some embodiments, the source adjudicating module 317 can adjudicate the trustworthiness of a file source 303 on a spectrum. In other words, rather than simply adjudicating a file source 303 as being malicious or benign, the file source 303 can be rated on a sliding scale of suspiciousness based on its determined reputation. Where, for example a file source 303 is adjudicated as being suspicious without reaching the threshold to be adjudicated as malicious, files 301 downloaded from that source 303 could be, for example, treated with greater suspicion during subsequent heuristic analysis.

Because the malware source management system 101 is monitoring files 301 being accessed by the members of a large client 103 base from a large number of different sources 303 in real time, new malicious file sources 303 distributing malware are identified quickly. When a file source 303 is adjudicated as being malicious, a file analyzing module 319 of the malware source management system 101 captures new files 301 from that file source 303 for malware analysis. Thus, new files 301 are captured from a source 303 as soon as the source is adjudicated to be malicious. Under the malware source management system 101, active file sources 303 are adjudicated as being malicious in real time based on many data points in the form of activity from a large client 103 base. By capturing new files 301 being distributed from these file sources 303, new pieces of malware are captured quickly, before a given file source 303 being used for distribution is moved.

It is to be understood that not all files 301 distributed by all file sources 303 adjudicated to be malicious are in fact malware. However, a file source 303 adjudicated to be malicious is one that has been identified distributing files 301 adjudicated to be malware. Therefore, any files 301 being distributed by that source 303 are held in suspicion, and it is desirable to analyze these files 301 more closely to determine whether they are in fact malware. For this reason, these files 301 are captured and subject to additional analysis by the file analyzing module to identify malware. This analysis can comprise employing any conventional techniques to identify malware. Where malware is identified, the malware can be studied to analyze its behavior, including what types of systems it targets and what exploits it uses to attempt to infect its targets. In many cases, a new piece of identified malware does not use any new exploits to attempt to infect targets, but instead relies on known, existing techniques. However, some pieces of new malware use previously unknown exploits (e.g., a newly discovered vulnerability in a specific version of a browser or other component). Where this is the case, these newly discovered exploits can be publicized and closed. Identified malware can also be used to create identifying signatures, or other information used for identifying the malware. Where a file 301 captured from a file source 303 adjudicated to be malicious is identified as malware, a new piece of malware is identified quickly, from an active distribution source 303. Countermeasures can be taken in a timely manner, including the patching of any new exploits used by the malware.

In addition to capturing the files 301 being distributed by adjudicated malicious file sources 303, a distribution analyzing module 321 of the malware source management system 101 can analyze how the file source 303 distributes the different files 301. More specifically, the distribution analyzing module 321 can capture information such as geographical distribution patterns, specific distribution techniques, characteristics of specific clients 103 to which the file source 303 attempts to distribute files 301, etc. Thus, where a file 301 captured from a file source 303 adjudicated to be malicious is identified as malware, not only has a new piece of malware been identified, but corresponding distribution information has been quickly identified as well.

Additionally, in response to a file source 303 being adjudicated as being malicious, a source blocking module 323 of the malware source management system 101 can aggressively block access to that file source 303. This can comprise blocking all client 103 access to the malicious source 303, or more targeted blocking based on file type (e.g., block any attempt to access the source 303 to obtain executable files, active content, etc.), geography (e.g., block all access originating in, e.g., the U.S. of malicious sources in, e.g., China and/or Russia), time (e.g., block access of malicious sites that have attempted to distribute malware in the last, e.g., hour, six hours) or combinations of such factors. How aggressively to block adjudicated malicious sources 303, for how long, and according to what criteria are variable design parameters.

Figure 4:
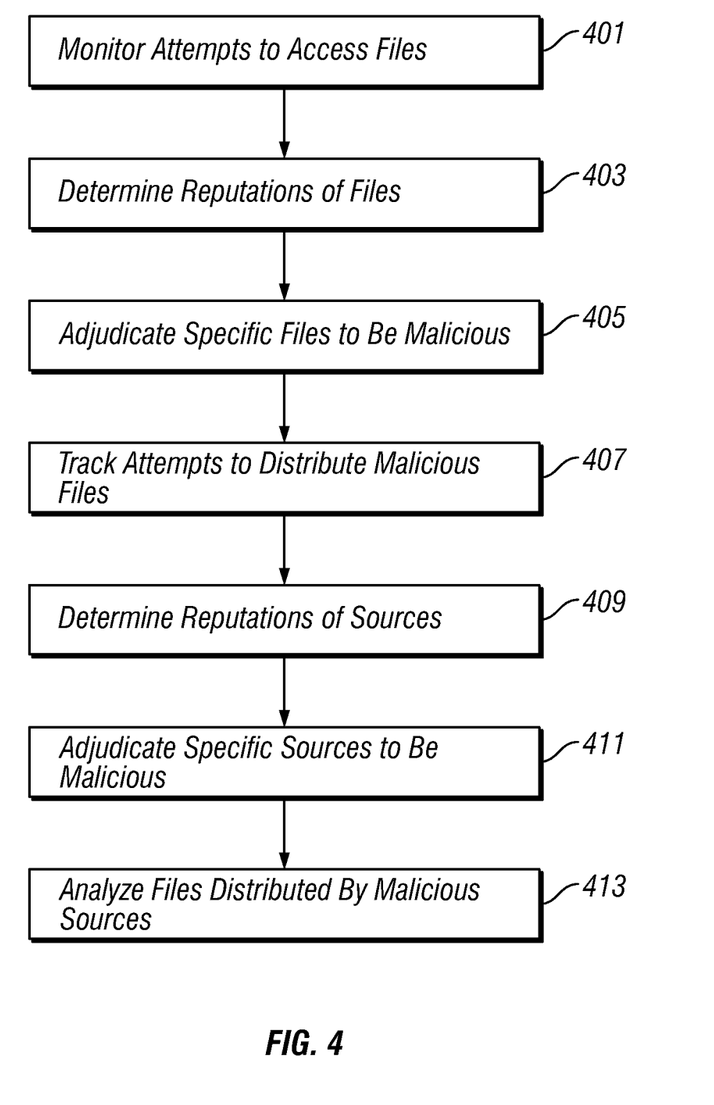
FIG. 4 is a flowchart of the operation of a malware source management system, according to some embodiments.

FIG. 4 illustrates steps of the operation of the malware source management system 101 (FIG. 1), according to some embodiments. The client monitoring module 307 (FIG. 3) monitors 401 attempts by a plurality of clients 103 (FIG. 1) to access files 301 (FIG. 3) from external file sources 303 (FIG. 3). For each monitored attempt, the file reputation determining module 309 (FIG. 3) determines 403 the reputation of the specific file 301 (FIG. 3) that the client 103 (FIG. 1) is attempting to access. Responsive to the determined reputation of a file 301 (FIG. 3) meeting a specific threshold, the file adjudicating module 311 (FIG. 3) adjudicates 405 the file 301 (FIG. 3) to be malicious. The distribution tracking module 313 (FIG. 3) tracks 407 attempts by file sources 303 (FIG. 3) to distribute files 301 (FIG. 3) adjudicated to be malicious to clients 103 (FIG. 1). The source reputation determining module 315 (FIG. 3) determines 409 reputations of file sources 303 (FIG. 3), responsive to tracked attempts by file sources 303 (FIG. 3) to distribute malicious files 301 (FIG. 3). Responsive to a determined reputation of a file source 303 (FIG. 3) meeting a specific threshold, the source adjudicating module 317 (FIG. 3) adjudicates 411 the file source 303 (FIG. 3) to be malicious. The file analyzing module 319 (FIG. 3) analyzes 413 files 301 (FIG. 3) made available for access by malicious file sources 303 (FIG. 3), to determine whether the analyzed files 301 (FIG. 3) comprise malware.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using file reputations to identify malicious file sources in real time, the method comprising the steps of:
    monitoring, by at least one computer, attempts by a plurality of client computers to access files from external file sources;
    for each monitored attempt by a client to access a file, determining, by the at least one computer, a reputation of the specific file that the client attempts to access;
    responsive to a determined reputation of at least one file meeting a specific threshold, adjudicating, by the at least one computer, the at least one file to be malicious;
    analyzing, by the at least one computer, the adjudicated file and distribution of the adjudicated file to identify exploits it uses to infect targets, responsive to adjudicating the at least one file to be malicious;
    tracking, by the at least one computer, attempts by external file sources to distribute files adjudicated to be malicious to clients of the plurality of client computers;
    determining, by the at least one computer, reputations of external file sources, responsive to tracked attempts by external file sources to distribute files adjudicated to be malicious to clients of the plurality of client computers;
    responsive to a determined reputation of at least one external file source meeting a specific threshold, adjudicating, by the at least one computer, the at least one external file source to be malicious;
    responsive to adjudicating the at least one external file source to be malicious, analyzing, by the at least one computer, files made available for access by the at least one external file source, to determine whether the analyzed files comprise malware;
    analyzing distribution of files from the at least one external file source adjudicated to be malicious, by the at least one computer, to identify file distribution patterns, the file distribution patterns comprising at least geographic distribution patterns; and
    publicizing, by the at least one computer, previously-unknown exploits.

2. The method of claim 1 wherein monitoring, by the at least one computer, attempts by the plurality of client computers to access files from external file sources further comprises:
    receiving, by the at least one computer from client computers of the plurality, indications of attempts to access files from remote file sources.

3. The method of claim 1 wherein monitoring, by the at least one computer, attempts by the plurality of client computers to access files from external file sources further comprises:
    monitoring, by the at least one computer, network traffic of client computers of the plurality; and
    detecting, by the at least one computer, attempts by client computers of the plurality to access files from remote file sources in the monitored network traffic.

4. The method of claim 1 wherein determining, by the at least one computer, the reputation of the specific file that a client of the plurality attempts to access further comprises:
    receiving, by the at least one computer, reputation information concerning the specific file from an external reputation determining system.

5. The method of claim 1 wherein determining, by the at least one computer, a reputation of the specific file that a client of the plurality attempts to access further comprises:
    performing, by the at least one computer, a reputation determination analysis of the specific file.

6. The method of claim 1 further comprising:
performing, by the at least one computer, a malware detection analysis of the specific file;
determining, by the at least one computer, a suspiciousness score of the specific file, based on at least one of: 1) the reputation of the specific file and 2) results of the malware detection analysis of the specific file; and
wherein the adjudicating step further comprises adjudicating, by the at least one computer, the at least one file to be malicious responsive to the determined suspiciousness score meeting a specific threshold.

7. The method of claim 1 wherein tracking, by the at least one computer, an attempt by a file source to distribute a file adjudicated to be malicious further comprises:
storing, by the at least one computer, at least an identification of the specific external file source, an identification of the specific file adjudicated to be malicious, and a time of the attempt to distribute the file.

8. The method of claim 1 further comprising:
determining, by the at least one computer, that at least one file made available by the at least one external file source adjudicated to be malicious comprises malware.

9. The method of claim 1 further comprising:
blocking at least some access to the at least one external file source adjudicated to be malicious, by the at least one computer.

10. At least one non-transitory computer readable storage medium storing a computer program product for using file reputations to identify malicious files sources in real time, the computer program product comprising:
program code for monitoring attempts by a plurality of client computers to access files from external file sources;
program code for determining, for each monitored attempt by a client to access a file, a reputation of the specific file that the client attempts to access;
program code for, responsive to a determined reputation of at least one file meeting a specific threshold, adjudicating the at least one file to be malicious;
program code for, responsive to adjudicating the at least one file to be malicious, analyzing the adjudicated file and distribution of the adjudicated file to identify exploits it uses to infect targets;
program code for tracking attempts by file sources to distribute files adjudicated to be malicious to clients of the plurality of client computers;
program code for determining reputations of external file sources, responsive to tracked attempts by external file sources to distribute files adjudicated to be malicious to the plurality of client computers;
program code for, responsive to a determined reputation of at least one external file source meeting a specific threshold, adjudicating the at least one external file source to be malicious;
program code for, responsive to adjudicating the at least one external file source to be malicious, analyzing files made available for access by the at least one external file source, to determine whether the analyzed files comprise malware; and
program code for analyzing distribution of files from the at least one external file source adjudicated to be malicious to identify file distribution patterns, the file distribution patterns comprising at least geographic distribution patterns; and
program code for publicizing previously-unknown exploits.

11. The computer program product of claim 10 wherein the program code for tracking an attempt by an external file source to a distribute file adjudicated to be malicious further comprises:
program code for storing at least an identification of the specific external file source, an identification of the specific file adjudicated to be malicious, and a time of the attempt to distribute the file.

12. The computer program product of claim 10 further comprising:
program code for determining that at least one file made available by the at least one external file source adjudicated to be malicious comprises malware.

13. The computer program product of claim 10 further comprising:
program code for blocking at least some access to the at least one external file source adjudicated to be malicious.

14. An apparatus for using file reputations to identify malicious files sources in real time, the apparatus comprising:
a processor;
system memory;
a client monitoring module, residing in the system memory, the client monitoring module being configured for monitoring attempts by a plurality of client computers to access files from external file sources;
a file reputation determining module, residing in the system memory, the file reputation determining module being configured for determining, for each monitored attempt by a client to access a file, a reputation of the specific file that the client attempts to access;
a file adjudicating module, residing in the system memory, the file adjudicating module being configured for, responsive to a determined reputation of at least one file meeting a specific threshold, adjudicating the at least one file to be malicious;
an exploit identification module residing in the system memory, the exploit identification module being configured for, responsive to adjudicating the at least one file to be malicious, analyzing the adjudicated file and distribution of the adjudicated file to identify exploits it uses to infect targets;
a distribution tracking module, residing in the system memory, the distribution tracking module being configured for tracking attempts by external file sources to distribute files adjudicated to be malicious to clients of the plurality of client computers;
a source reputation determining module, residing in the system memory, the source reputation determining module being configured for determining reputations of external file sources, responsive to tracked attempts by external file sources to distribute files adjudicated to be malicious to the plurality of client computers;
a source adjudicating module, residing in the system memory, the source adjudicating module being configured for, responsive to a determined reputation of at least one external file source meeting a specific threshold, adjudicating the at least one external file source to be malicious;
a file analyzing module, residing in the system memory, the file analyzing module being configured for, responsive to adjudicating the at least one external file source to be malicious, analyzing files made available for access by the at least one external file source, to determine whether the analyzed files comprise malware;
a file distribution analysis module residing in the system memory, the file distribution analysis being configured for analyzing distribution of files from the at least one external file source adjudicated to be malicious to identify file distribution patterns, the file distribution patterns comprising at least geographic distribution patterns; and an exploit-publicizing module residing in the system memory, the exploit-publicizing module being configured for publicizing previously-unknown exploits.

15. The apparatus of claim 14 wherein the client monitoring module is further being configured for:

receiving, from client computers of the plurality, indications of attempts to access files from remote file sources.

16. The apparatus of claim 14 wherein the client monitoring module is further being configured for:

monitoring network traffic of client computers of the plurality; and detecting attempts by client computers of the plurality to access files from remote file sources in the monitored network traffic.

17. The apparatus of claim 14 wherein the file reputation determining module is further configured for:

receiving reputation information concerning the specific file from an external reputation determining system.

18. The apparatus of claim 14 wherein the file reputation determining module is further configured for:

performing a reputation determination analysis of the specific file.

19. The apparatus of claim 14 the file adjudicating module is further configured for:

performing a malware detection analysis of the specific file;

determining a suspiciousness score of the specific file, based on at least one of: 1) the reputation of the specific file and 2) results of the malware detection analysis of the specific file; and adjudicating the at least one file to be malicious responsive to the determined suspiciousness score meeting a specific threshold.

20. The apparatus of claim 14 wherein the distribution tracking module is further configured for:

storing at least an identification of the specific external file source, an identification of the specific file adjudicated to be malicious, and a time of the attempt to distribute the file.

* * * * *